United States Patent [19]

Poccia

[11] 4,442,726

[45] Apr. 17, 1984

[54] ADJUSTABLE STROKE ROTARY INDEXING MECHANISM

[75] Inventor: Michael J. Poccia, Rochester, N.Y.

[73] Assignee: Burroughs Corporation, Detroit, Mich.

[21] Appl. No.: 243,976

[22] Filed: Mar. 16, 1981

[51] Int. Cl.³ .............................................. F16H 29/04
[52] U.S. Cl. ...................................... 74/117; 74/837; 74/571 R
[58] Field of Search ..................... 74/116, 117, 571 R, 74/571 L, 571 M, 600, 831, 835, 836, 837

[56] References Cited

U.S. PATENT DOCUMENTS

| | | | |
|---|---|---|---|
| 250,404 | 12/1881 | Syverson | 74/600 |
| 3,213,697 | 10/1965 | Hartmann et al. | 74/117 |

FOREIGN PATENT DOCUMENTS 3659  9/1919  Netherlands .......................... 74/600

*Primary Examiner*—Lawrence J. Staab
*Attorney, Agent, or Firm*—David G. Rasmussen; Kevin R. Peterson; Edmund M. Chung

[57] ABSTRACT

An improved processing apparatus for adjustable stroke rotary indexing is provided. The apparatus comprises a rotatable input shaft, an intermediate shaft drivably and mechanically coupled to the input shaft, an output shaft coupled to the input shaft by a one-way clutch, and means for selectively adjusting the angular stroke of the output shaft. The mechanical coupling between the input and intermediate shafts comprises a planar four-link mechanism configured to operate in crank-rocker fashion such that continuous rotary input motion will produce angular rocking motion in the intermediate shaft. The limit positions of the oscillating shaft are a function of the length of the crank in the planar four-link crank-rocker coupling. The crank comprises a first crank member mounted on the input shaft and a second crank member rotatably mounted with respect to and lockably engagable with the first member. A method and means are provided for adjusting the angular stroke by altering the length of the crank through adjusting the angular displacement between the first and second crank members.

9 Claims, 5 Drawing Figures

ADJUSTABLE STROKE ROTARY INDEXING MECHANISM

FIELD OF THE INVENTION

This invention relates to the field of rotary indexing systems for indexing a moving web of material and more particularly to a rotary indexing method and apparatus for moving a material web past an indexing tool at adjustable strokes.

BACKGROUND OF THE INVENTION

In rotary indexing systems it is desirable to be able to accommodate variable processing intervals. One way of accomplishing this result is to vary the frequency of the processing tool while holding the movement of the material web constant past the tool. Another way is to vary the movement of the material web while holding the frequency of the processing tool constant.

The instant invention provides an apparatus for driving the material webs at adjustable strokes. The size of the stroke determines the size of the processing interval. The invention uses a crank-rocker four-link linkage between a driving input shaft and the output shaft with a one-way clutch on the output shaft.

The instant invention utilized the following criteria defining the kinematics of crank-rocker four-link mechanisms. A planar four-link mechanism will have a crank and rocker if: (1) the crank is the shortest link, and (2) the sum of the links of the longest and shortest links is less than or equal to the sum of the lengths of the other two links. The angular indexing stroke is the magnitude of the smallest angle between the two limit positions of the rocker arm. The stroke may be changed by changing only the length of the input crank.

SUMMARY OF THE INVENTION

The instant invention constitutes an improved rotary indexing apparatus providing simple, selective adjustment of the angular stroke through application of the principles of planar four-link mechanism motion. Structurally, the apparatus comprises a rotatable input shaft; an intermediate shaft drivably and mechanically coupled to the input shafts; an output shaft coupled to the intermediate shaft by a one way clutch; and means for adjusting the angular stroke of the output shaft. The mechanical coupling between the input and the intermediate shaft comprises a crank-rocker planar four-link linkage in which the crank is mounted on the input shaft and the rocker is mounted on the intermediate shaft. The crank and rocker are each pivotally connected to a coupler link. The fourth link is the distance between the fixed parallel input and intermediate shafts. The crank comprises a first member mounted on the input shaft and a second member rotatably mounted with respect to and lockably engagable with the first member such that when the second member is locked it will rotate with the first member but when it is unlocked it is rotatable with respect to the first member. The coupler link is pivotally connected to the second crank member. The angular stroke adjustment means adjusts the stroke by altering the crank length through an adjustment in the relative angular displacement between the first and second crank members. The means for adjusting the angular stroke comprises brake means for securing the intermediate shaft and the rocker in place and drive means for turning the first crank member to provide relative angular displacement between the first and second crank members.

The process for adjusting the angular stroke of the apparatus of the instant invention comprises the steps of unlocking the first crank member from the second crank member, engaging the brake on the intermediate shaft, turning the input shaft to provide relative angular displacement between the first and second members until the desired crank length is obtained, locking the second member to the first member and disengaging the brake on the intermediate shaft.

One object of the instant invention is to provide easy selective adjustment of the angular stroke in a rotary indexing apparatus.

Another object of the instant invention is to provide selective adjustment of the angular stroke in a rotary indexing apparatus through adjustment of the length of the crank element of a planar four-link crank-rocker coupling between the input and output shafts.

Yet another object of the instant invention is to provide a rotary indexing apparatus having a crank element comprising a first member and a second member rotatably mounted with respect to the first member whereby the length of the crank may be adjusted by causing relative angular displacement between the first and second members and whereby adjusting the length of the crank produces an adjustment of the angular stroke of the rotary indexing apparatus.

Another object of the instant invention is to provide first and second crank members which are lockably engagable with one another.

Still another object of the instant invention is to provide a first crank member comprising a disk eccentrically mounted on the input shaft and a second crank member comprising a collar rotatably mounted on the perimeter of the disk.

Still another object of the instant invention is to provide a crank member comprising a first disk mounted on the input shaft and a second disk rotatably mounted in the interior of the first disk.

Another object of the instant invention is to provide means for adjusting the crank element by providing relative angular displacement between the first and second crank members.

Another object of the instant invention is to provide means for adjusting the crank length comprising a brake and drive means for turning the first crank member to produce relative angular displacement between the first and second crank members.

Another object of the instant invention is to provide a method for adjusting the angular stroke comprising the steps of unlocking the first member from the second member, engaging the brake on the intermediate shaft, driving the input shaft to provide relative angular displacement between the first and second members until the desired crank length is obtained, locking the second member to the first member and disengaging the brake on the intermediate shaft.

DETAILED DESCRIPTION OF THE INVENTION

Figure 1:
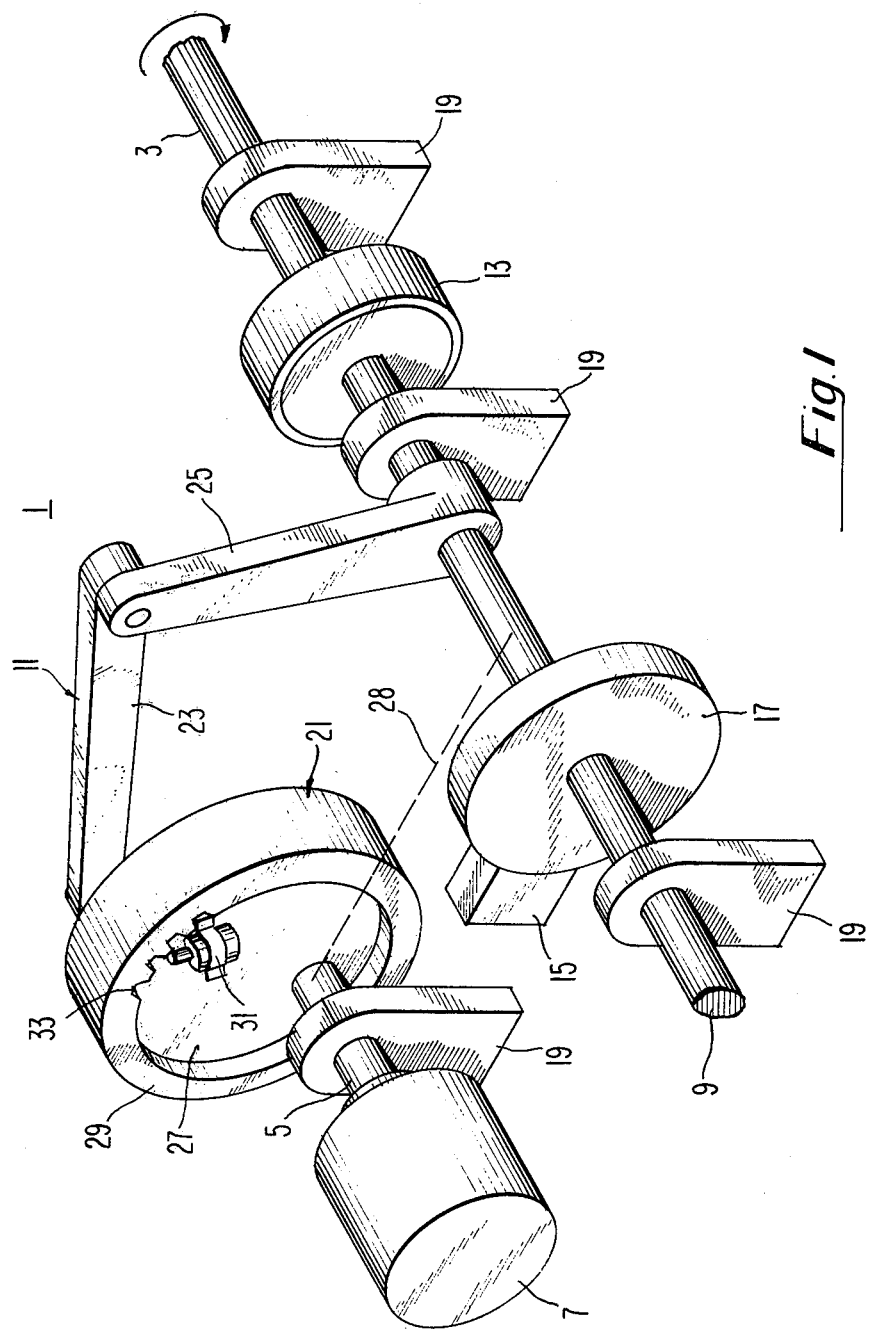
FIG. 1 is an isometric view of the rotary indexing apparatus of the instant invention having adjustable angular stroke.

Turning now to the drawings, FIG. 1 shows the rotary indexing mechanism having an output shaft 3 turning at adjustable stroke in the direction shown by the arrow. The indexing mechanism includes an input shaft 5 which is driven by a driving motor 7. An intermediate shaft 9 is driven by the input shaft 5 through the mechanical coupling 11. The intermediate shaft 9 is parallel to and spaced apart from the input shaft 5. The output shaft 3 is coupled to the intermediate shaft 9 by a one way clutch 13. The intermediate shaft 9 has brake means 15 coupled to disk 17 mounted on the intermediate shaft 9. The input shaft 5, the intermediate shaft 9 and the output shaft 3 are each fixedly mounted through anchors 19.

The output shaft 3 drives a material web not shown in the drawings. It would be readily apparant to one ordinarily skilled in the art how to utilize the output shaft to drive a material web.

The mechanical coupling 11 between the input 5 and intermediate 9 shafts includes a crank link 21, a coupler link 23, and a rocker link 25. These members, taken with a fixed link represented by the dashed line 28 between the parallel input and intermediate shafts, form a planar four-link linkage configured to operate in crank-rocker fashion. The crank link 27 is fixedly mounted to the input shaft 5 as is the rocker link 25 to the intermediate shaft 9. The coupler link 11 is pivotally connected to both the crank link 21 and the rocker link 25 shown in FIG. 1.

In FIG. 1, the crank link includes a disk 27 eccentrically mounted to the input shaft 5 and a collar 29 rotatably mounted on the perimeter of the disk 27. The coupler link 23 is pivotally connected to the crank collar 29. A solenoid actuated plunger 31 is mounted on the disk 27 for lockable engagement with the slots 33 formed in the collar 29.

Figure 2:
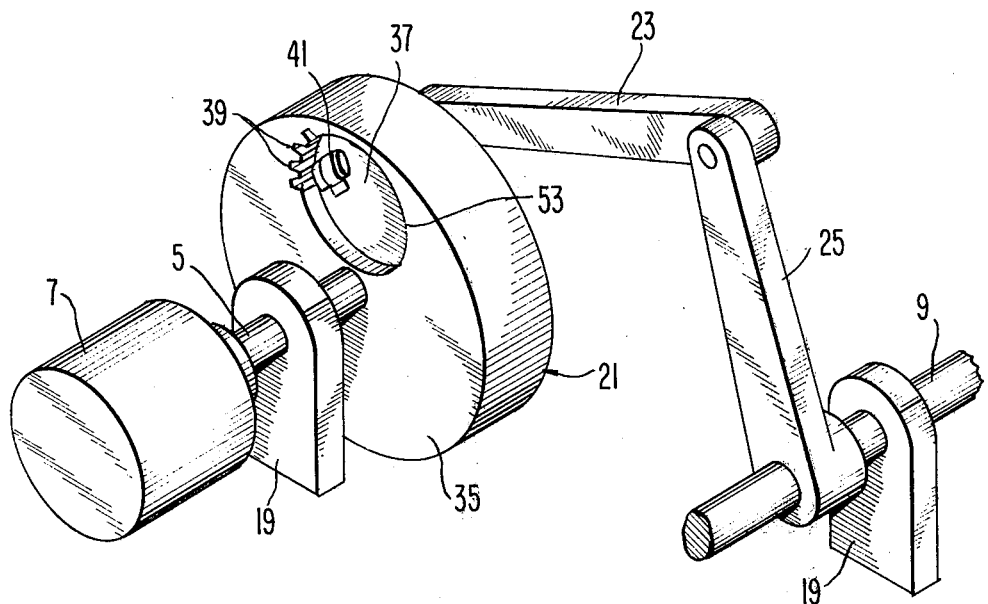
FIG. 2 shows an alternative embodiment of the crank element of the instant invention.

FIG. 2 shows an alternative embodiment of the crank link 21 wherein a first disk 35 is fixedly mounted on the input shaft and a second disk 37 is rotatably mounted in the interior of the first disk 35. A plurality of slots 39 are formed in the first disk 35 and the solenoid actuated plunger 41 is mounted on the second disk 37 such that selective lockable engagement may be made between the first and second disks 35 and 37. Alternatively, the slots 39 could be formed in the second disk 37 and the solenoid actuated plunger 41 could be mounted on the first disk 35.

Figure 3:
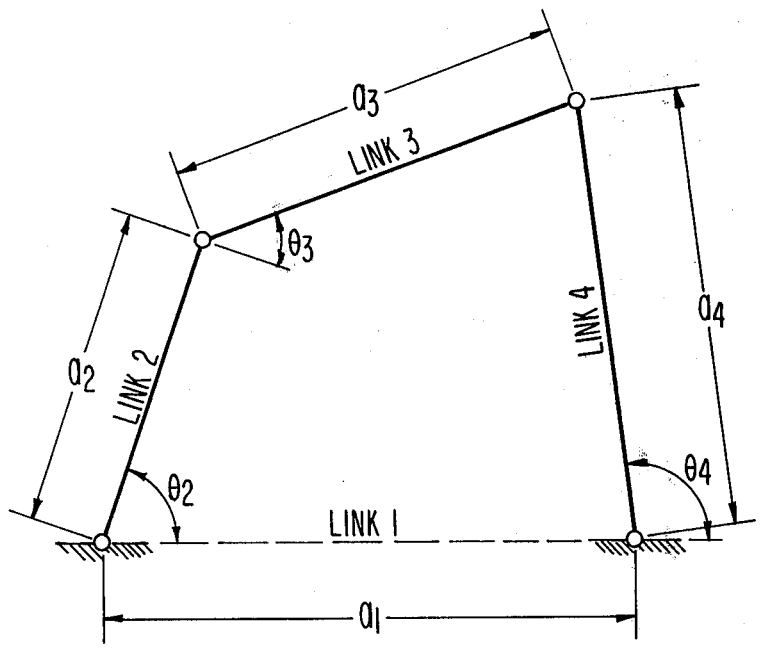
FIG. 3 shows a crank-rocker planar four-link mechanism.

FIG. 3 shows a planar four-link mechanism 43 configured to operate in crank-rocker fashion. The mechanism 43 has a crank link 45, a coupler link 47 and a rocker link 49 as well as a fixed link represented by the dashed line 51. The kinematic characteristics of crank-rocker four-link mechanisms are well known to those skilled in the art. The Grashof criteria indicate that a planar four-link device will have a crank and a rocker if: (1) the crank is the shortest link, and (2) the sum of the lengths of the longest and shortest links is less than or equal to the sum of the lengths of the other two links. In FIG. 3, the two rocker link limit positions, $\theta_{4L1}$ and $\theta_{4L2}$ are given by:

$$\theta_{4L1} = \cos^{-1}\left[\frac{(a_3 + a_2)^2 - a_1^2 - a_4^2}{2a_1 a_4}\right]$$

and $$\theta_{4L2} = \cos^{-1}\left[\frac{(a_3 - a_2)^2 - a_4^2 - a_1^2}{2a_1 a_4}\right]$$

where $a_1$, $a_2$, $a_3$ and $a_4$ are the links as shown in FIG. 3. The angular indexing stroke is the magnitude of the smallest angle between the two limit positions ($\sqrt[3]{\theta_{4L1} - \theta_{4L2}}$) or $[360° - |\theta_{4L1} - \theta_{4L2}|]$, whichever is smaller. This relationship shows that the stroke may be changed by changing only the input crank length, $a_2$.

If the fixed link length, $a_1$, the coupler link length $a_3$, and the rocker link length $a_4$ are fixed, the maximum allowable crank length, $a_2$, for crank-rocker operation is: (1) $a_2$ must be shorter than $a_3$, $a_1$, and $a_4$; and (2) $a_2$ plus the longest link length must be shorter than the sum of the other two link lengths.

It is apparent that if the above criteria are satisfied for the longest crank length, they are satisfied for all crank lengths under their maximum value. Adjustments to the stroke are accomplished by altering the crank length of any value within this range.

In operation, the selective adjustment of the stroke is achieved as follows. The means for adjusting the stroke includes a brake 15 and motor 7 as shown in FIG. 1. The brake 15 secures in place the intermediate shaft 9 and the rocker link 25. Because the coupler link 23 is pivotally connected to the rocker link 25 the coupler link 23 is free to move on its end which is pivotally connected to the crank 21. The motor 7 is for not only driving the indexing system in the operate mode but also for turning the input shaft 5 and crank 21 mounted thereon so that the stroke may be adjusted. The process for adjusting the stroke includes the steps of disengaging the collar 29 from the eccentric disk 27 engaging the brake 15 on the disk 17 which is moved on the intermediate shaft 9, turning the input shaft 5 and eccentric disk 27 until the predetermined relative rotational displacement between the disk 27 and collar 29 is achieved for the desired angular output stroke, reengaging the collar 29 to the eccentric disk 27 and disengaging the output brake 15.

Figure 4:
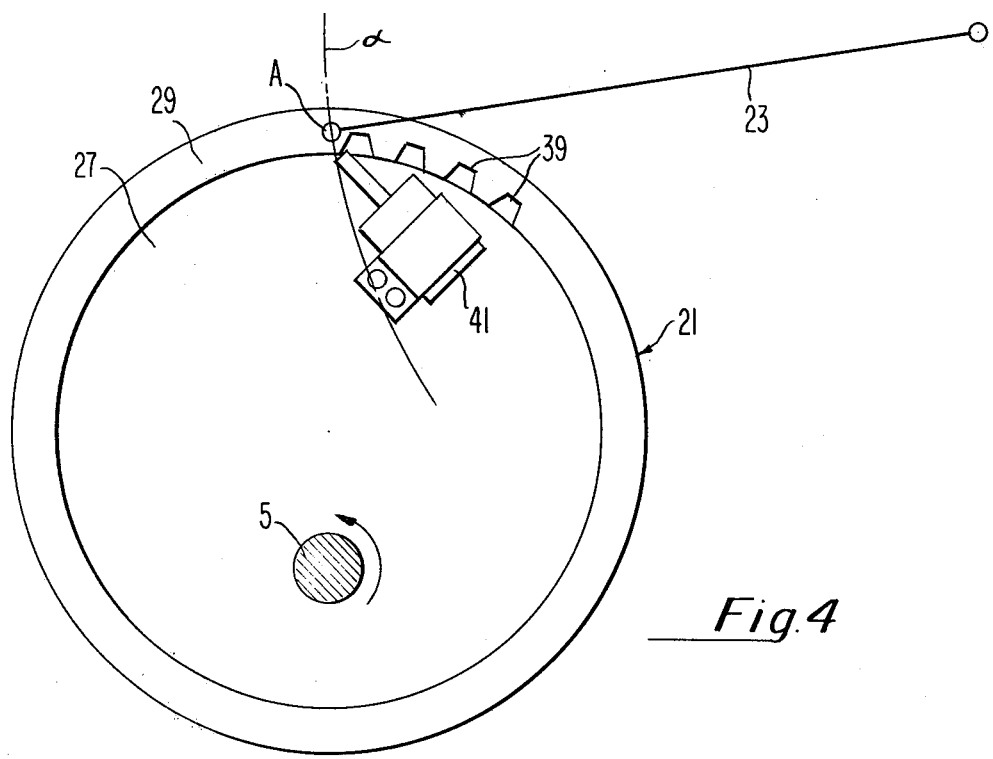
FIG. 4 shows one embodiment of the crank element of the rotary indexing apparatus in the instant invention.

FIG. 4 shows one embodiment of the adjustable length crank 21 of the instant invention wherein a disk 27 is eccentrically mounted on an input shaft 5 and a collar 29 is rotatably mounted on the perimeter of the disk 27. Coupler link 23 is pivotally connected to collar 29. Coupler link 23 is connected at its other end to a rocker link (not shown).

FIG. 4 also shows the kinematic relationship between the eccentric disk 27 and the collar 29. It is assumed that the frictional forces between the disk 27 and the collar 29 rotatably mounted thereon are sufficient to prevent the collar 29 from moving except as a result of torque supplied through the coupler link 23. The coupler link 23 is pivotally connected on one end to the collar 29 at point A. The coupler link 23 can not move on its other end since it is connected to the rocker link (not shown) which is braked during the stroke adjustment process, but the end which is pivotally connected to the collar 29 is free to move along the circular arc $\alpha$. Likewise, point A of the collar 29 will be constrained to move along arc α. By rotating the input shaft 5 in the direction shown by the arrow, relative angular displacement between the disk 27 and collar 29 will occur, and point A will move along arc α in the direction of the arrow. The input shaft 5 and disk 27 are rotated until the solenoid actuated plunger 41 is aligned with the predetermined slot 39 corresponding to the desired crank length adjustment and engagement of the plunger 41 with the slot 39 is made.

Figure 5:
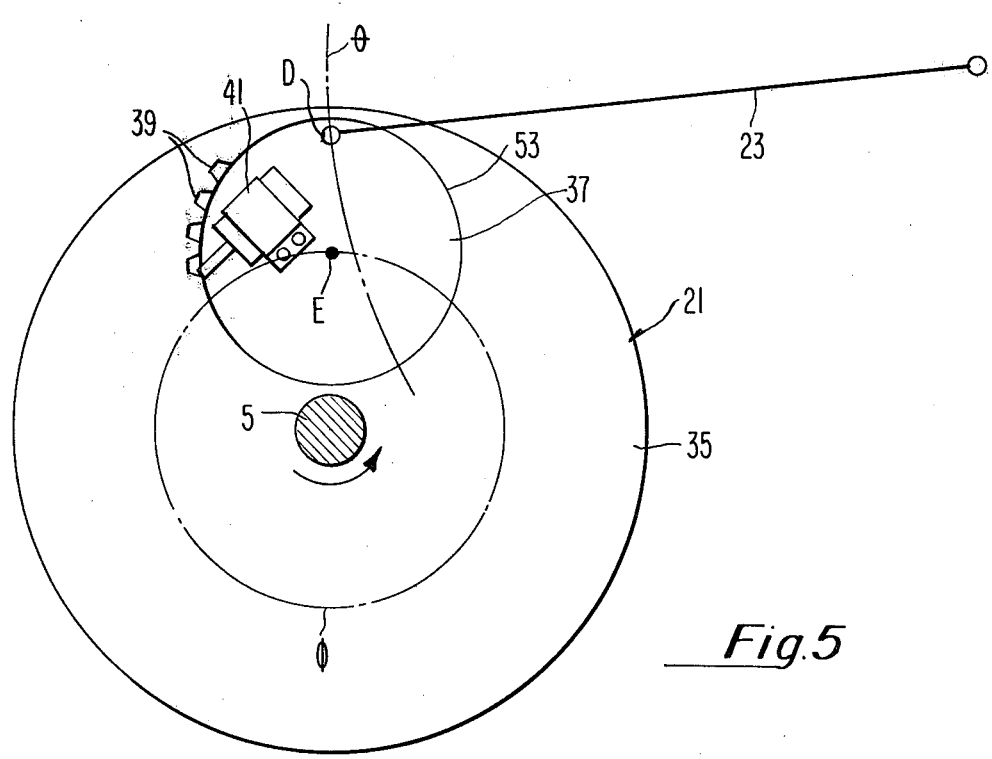
FIG. 5 shows another embodiment of the crank element of the rotary indexing apparatus of the instant invention.

FIG. 5 shows another embodiment of the adjustable length crank 21 of the instant invention wherein a first disk 35 is mounted on the input shaft 5 and a second disk 37 is mounted within a track 53 in the interior of the first disk 35.

FIG. 5 also shows the kinematic relationship between the first and second disks 35 and 37 and the coupler link 23. It is assumed that the frictional forces between the track 53 and the second disk 37 are sufficient to prevent the second disk 37 from moving on the track except as a result of torque supplied from coupler link 23. The coupler link 23 is pivotally connected to the second disk 27 at point D. One end of the coupler link 23 is fixed as a result of the brake (not shown) being set, but its other end is free to move along the arc labeled θ.

Rotating the first disk 35 will cause the second disk 37 to be carried along with the first disk such that the center of the second disk is constrained to travel in a circle φ which is centered at the input shaft 5 as shown in FIG. 5b. Therefore, it is observed that while point D in the second disk must move along arc θ, center point E is constrained to move along the circle φ. As the input shaft 5 and the first disk 35 are turned in the direction shown, the second disk 37 will move within the track 53 in the first disk 35. Point A will move in the direction of the arrow along arc θ. This rotation may be continued until the second disk 37 is turned within the track 53 enough for the solenoid actuated plunger 41 to reach the slot 39 corresponding to the desired adjustment of the crank length.

What is claimed is:

1. An apparatus for providing intermittent rotary output motion of adjustable angular stroke comprising:
a rotatable input shaft;
an intermediate shaft disposed in spaced parallel relationship with said input shaft, said intermediate shaft being drivably and mechanically coupled to said input shaft, said mechanical coupling yielding oscillatory motion in said driven intermediate shaft when said input shaft is driven at a constant angular speed;
said mechanical coupling between said input shaft and said intermediate shaft comprising an adjustable length crank mounted on said input shaft, a rocker link mounted on said intermediate shaft and a coupler link pivotally connected on its first end to said crank and on its second end to said rocker link, said mechanical coupling being dimensionally configured to be operated as a crank-rocker planar four-link mechanism for a predetermined set of crank length adjustments;
said adjustable length crank comprising a first member mounted on said input shaft and a second member rotatably mounted with respect to said first member, said second member being lockably engagable with said first member such that when said second member is locked, it will rotate with said first member, but when said second member is unlocked, it will be rotatable with respect to said first member; said second member being pivotably connected to said first end of said coupler link;
a rotatable output shaft coupled to said intermediate shaft by a one-way clutch, said output shaft having an angular stroke such that said output shaft is driven with said intermediate shaft in one cycle of said intermediate shaft's oscillatory stroke; and
means for adjusting the angular stroke of said output shaft comprising a brake for securing in place said intermediate shaft and said rocker link mounted on said intermediate shaft and drive means for turning said input shaft and said first member mounted on said input shaft.

2. The apparatus as recited in claim 1 wherein said first member comprises a disk eccentrically mounted on said input shaft and said second member comprises a collar rotatably mounted on the perimeter of said disk and pivotally connected to said first end of said coupler link.

3. The apparatus as recited in claim 1 wherein said drive means comprises a motor.

4. The apparatus as recited in claim 5 wherein said lockable engagement between said collar and said disk comprises a plurality of recesses in said collar and a plunger mounted on said disk for selectively lockably engaging said recesses.

5. The apparatus as recited in claim 1 wherein said first member comprises a first disk mounted on said input shaft and said second member comprises a second disk rotatably mounted in the interior of said first disk.

6. The apparatus as recited in claim 1 wherein said means for adjusting the angular stroke of said output shaft comprises a brake for securing in place said intermediate shaft and said rocker link mounted on said intermediate shaft and drive means for turning said input shaft and said disk eccentrically mounted on said input shaft.

7. The apparatus as recited in claim 6 wherein said drive means comprises a motor.

8. The apparatus as recited in claim 6 wherein said lockable engagement between said second disk and said first disk comprises a plurality of recesses in said second disk and a plunger mounted on said first disk for selectively lockably engaging said recesses.

9. A process for adjusting the angular stroke of a rotary indexing mechanism comprising the steps of:
providing a rotatable input shaft;
providing an intermediate shaft disposed in spaced parallel relationship with said input shaft, said intermediate shaft being drivably and mechanically coupled to said input shaft, said mechanical coupling yielding oscillatory motion in said driven intermediate shaft when said input shaft is driven at a constant angular speed, said mechanical coupling comprising an adjustable length crank mounted on said input shaft, a rocker link mounted on said intermediate shaft and a coupler link pivotally connected on its first end to said crank and on its second end to said rocker link, said mechanical coupling being dimensionally configured to operate as a crank-rocker planar four-link mechanism for a predetermined set of adjustments to said crank length, said adjustable length crank comprising a first member mounted on said input shaft and a second member rotatably mounted with respect to said first member, said second member being lockably engagable with said first member such that when said second member is locked it will rotate with said first member but when said second member is unlocked it will be rotatable with respect to said first member;

providing a rotatable output shaft coupled to said intermediate shaft by a one-way clutch, said output shaft having an angular stroke such that said output shaft is driven with said intermediate shaft in one cycle of said intermediate shaft's oscillatory stroke but remains stationary during the opposite cycle of said intermediate shaft's oscillatory stroke;

providing means for adjusting the angular stroke of said output shaft, said means for adjusting said angular stroke comprising a brake for securing in place said intermediate shaft and said rocker link mounted on said intermediate shaft and drive means for turning said input shaft and said first member eccentrically mounted on said input shaft;

unlocking said second member from said first member;

engaging said brake on said intermediate shaft;

turning said input shaft to provide relative angular displacement between said first member and said second member until the desired crank length is obtained;

locking said second member to said first member; and disengaging said brake on said intermediate shaft.

* * * * *